United States Patent

Bricot et al.

[11] 4,037,929
[45] July 26, 1977

[54] OPTICAL PROJECTION DEVICE AND AN OPTICAL READER INCORPORATING THIS DEVICE

[75] Inventors: Claude Bricot; Michel Hareng; Erich Spitz, all of Paris, France

[73] Assignee: Thomson-Brandt, Paris, France

[21] Appl. No.: 718,475

[22] Filed: Aug. 30, 1976

[30] Foreign Application Priority Data

Sept. 3, 1975 France .................. 75.27008

[51] Int. Cl.$^2$ .......................... G02F 1/13
[52] U.S. Cl. ............... 350/160 LC; 179/100.3 V; 350/150; 350/175 DR; 350/180; 358/128
[58] Field of Search ........... 350/150, 160 R, 160 LC, 350/175 DR, 175 GN, 180; 179/100.3 V; 358/128

[56] References Cited

U.S. PATENT DOCUMENTS 3,309,162  3/1967  Kosanke et al. ............ 350/160 R
3,424,513  1/1969  Lotspeich .................... 350/180
3,857,629  12/1974  Freiser ........................ 350/160 LC

OTHER PUBLICATIONS

Schnur et al., "Prospectus for the Development of Liquid Crystal Waveguides", NRL Report, No. 7507, Nov. 10, 1972.

Primary Examiner—Edward S. Bauer
Attorney, Agent, or Firm—Cushman, Darby & Cushman

[57] ABSTRACT

This invention relates to a projection device of which the optical device having a focal length is variable under the effect of an electrical signal and comprises a hollow transparent lens into which a liquid nematic crystal is introduced. Under the effect of the electrical signal applied between two transparent electrodes respectively arranged on the two inner surfaces of the lens, the index of the liquid crystal for the direction of incidence of the projected beam is capable of varying as a result of the oscillation of the molecules of the liquid crystal, the position of the focussing point of the projected beam varying in consequence.

6 Claims, 4 Drawing Figures

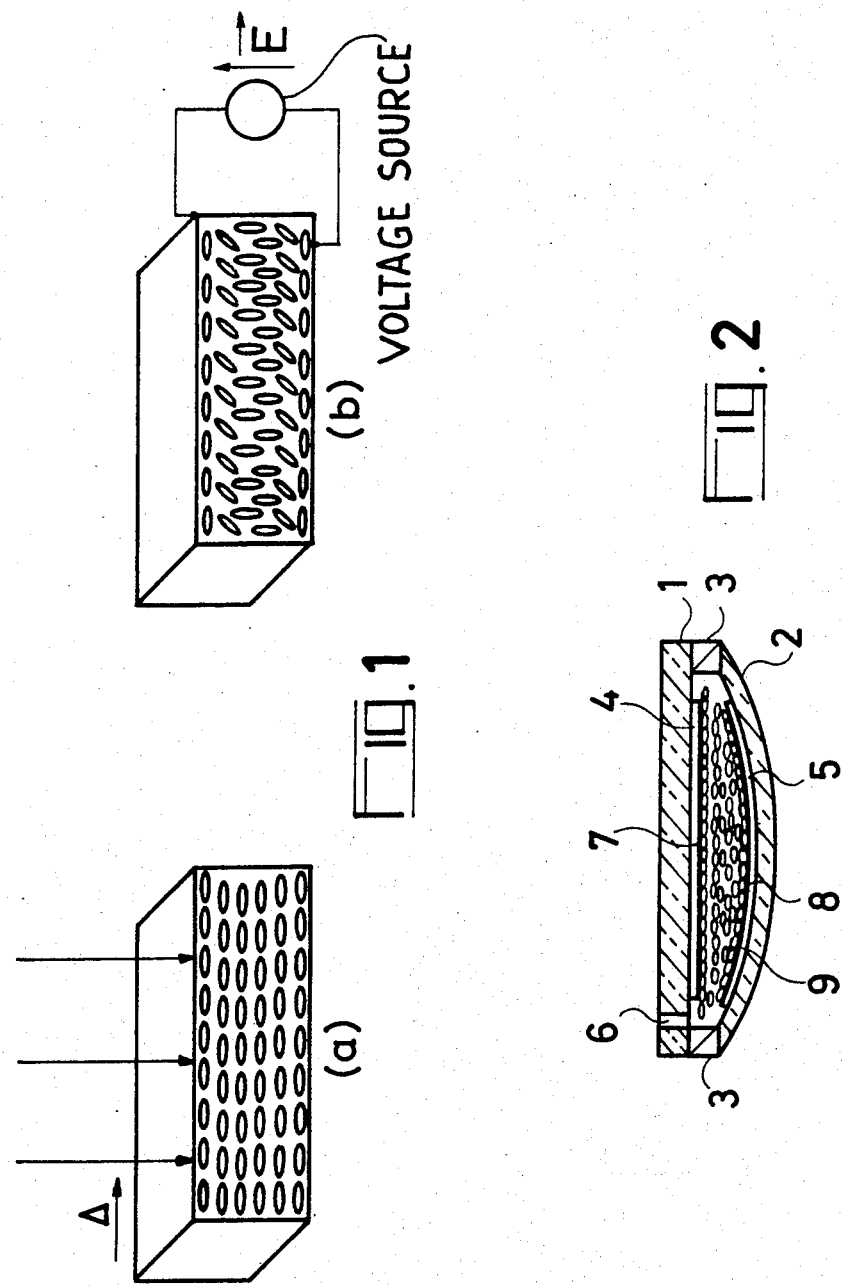

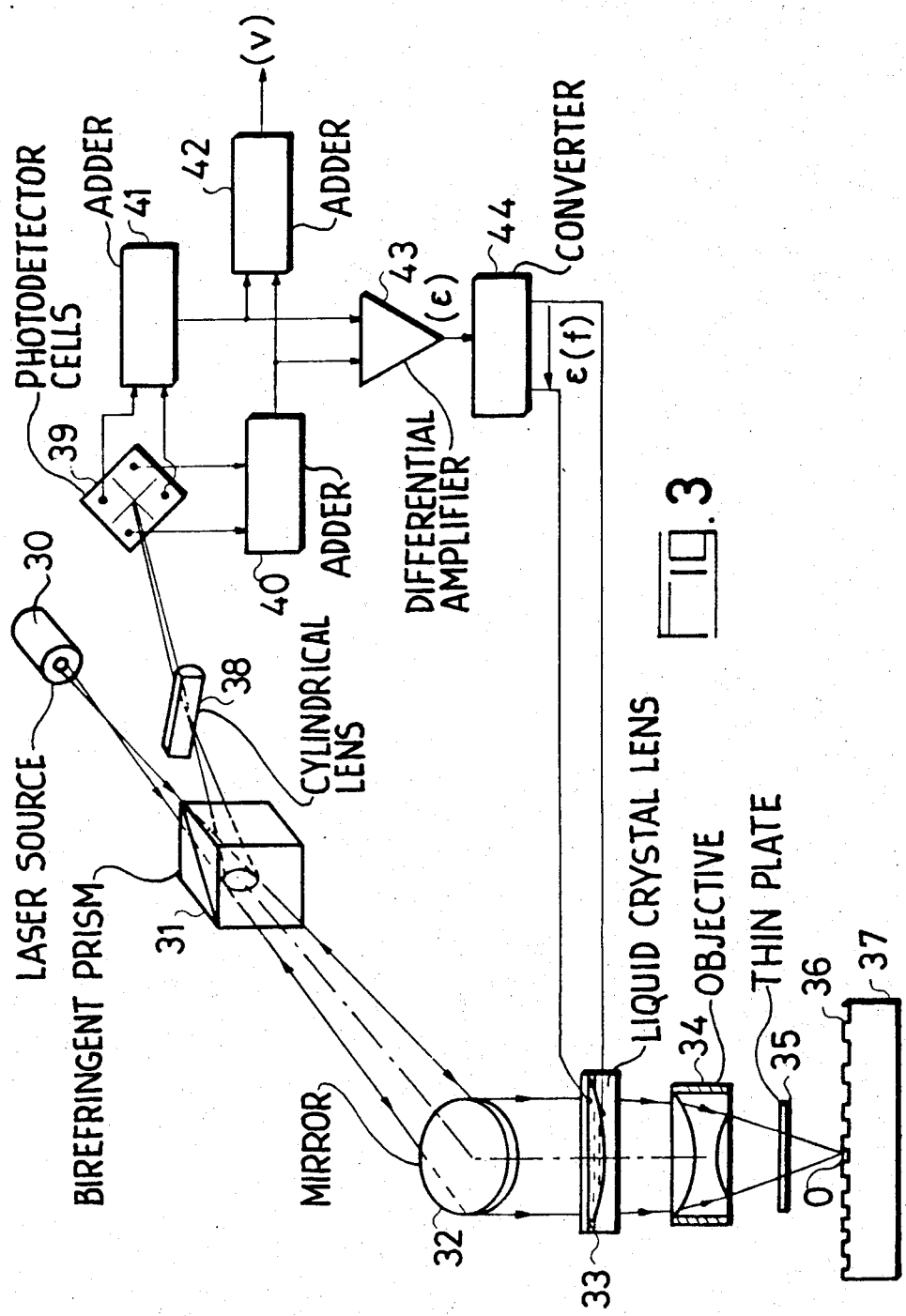

OPTICAL PROJECTION DEVICE AND AN OPTICAL READER INCORPORATING THIS DEVICE

This invention relates to the reading of information recorded on a track carried by a moving data carrier in the form of a disc or tape. More particularly, the invention relates to an optical device for projecting a light spot onto this data carrier, and to an optical reader incorporating this device.

The optical reading of information recorded at high density involves the problem of accurately focussing the light beam onto the track to be read, this track having to be illuminated by a spot of very small dimensions to obtain effective restoration of the information. It is known that the movement of an element of the optical reading device can be controlled in dependence upon a focussing error signal.

A movement such as this has the disadvantage of causing acoustic noise which is troublesome in normal use.

The object of the present invention is to provide a projection device of which the focal length is variable under the control of an electrical signal, eliminating the need for any movement in the optical projection device.

According to the invention, there is provided an optical projection device for focussing an optical beam having an optical axis and polarized rectilinearly in a direction Δ perpendicular to said optical axis, comprising a hollow glass lens arranged on the path of said beam, said hollow glass lens having inner walls and comprising two transparent electrodes arranged on said inner walls, supply means for applying to said two electrodes a variable electrical field, said lens containing a liquid nematic crystal having molecules capable of oscillating under the action of said electrical field, the index thus presented by said liquid crystal to said beam varying between the ordinary index $n_o$ and the extraordinary index $n_E$ of said liquid crystal.

For a better understanding of the invention and to show how the same may be carried into effect, reference will be made to the following description and the attached drawings among which:

FIG. 1 is a diagram explaining the operation of the device according to the invention;

FIG. 2 shows a lens of variable focal length of the type used in the projection device according to the invention;

FIG. 3 shows a projection device according to the invention.

The invention utilises the effect of the variation in index of a liquid nematic crystal for a substantially parallel polarized radiation beam, this variation occuring as a direct result of the application of an alternating electrical field parallel to the direction of propagation of the beam which causes the molecules of the liquid crystal to oscillate.

An external electrical field may be used for controlling the optical characteristics of a liquid crystal film without destroying the monocrystalline arrangement thereof:

Assuming that a liquid crystal with positive dielectric anisotropy is introduced between two walls, the molecules which are in the form of elongate spindles may be oriented in a direction Δ parallel to the walls by smearing the walls or under the influence of a surfactant applied beforehand to the walls (FIG. 1a).

The optical axis of the crystal, which corresponds to the ordinary index $n_o$, is parallel to the direction Δ of orientation of the molecules. If the incident beam is perpendicular to the walls, as shown in FIG. 1 a), and hence to the direction of the molecules, and if it is polarized in the direction Δ, the index of the liquid crystal film is substantially equal to the maximum index $n_E$ of the crystal. If each of the walls carries a transparent electrode and if an electrical field is applied to the liquid crystal, by means of a voltage source the molecules of the crystal oscillate and tend to become oriented parallel to the field $\vec{E}$, as shown in FIG. 1b), and hence to the direction of the beam. The index thus presented to the beam is substantially the ordinary index $n_o$, providing the field applied is sufficiently intense.

Finally, if the field is cut, the molecules tend to become reoriented parallel to the walls in the direction of alignment imposed by the walls and the index tends to return to the extraordinary index $n_E$. However, if the thickness of the liquid crystal film is great, the orienting effect of the walls is weak for the molecules which are remote therefrom when the field is eliminated, and the time required for the index to return to its initial value is long.

It is thus possible for the index of an optical element to be varied by means of an electrical signal. In order to vary the position of the focussing point of a light beam, the optical element used will be in the form of a hollow transparent lens which consists of two walls fixed to one another by means of liners determining the thickness of the lens and inside which a liquid nematic crystal is introduced. The variation in index under the effect of an electrical signal produces a simultaneous variation in the focal length of the lens thus formed and hence a variation in convergence of the system formed by the lens associated with the reading lens of an optical projection device.

In practice, to obtain a device of variable focal length which follows the variations of an error signal, it is preferable for the response time to be the same when it is necessary to reduce and then increase the focal length.

The product used will with advantage be a lens of the liquid crystal type having a dielectric anisotropy variable in dependence upon the electrical signal applied to it. Certain crystals have this property. Their dielectric anisotropy is positive for a frequency $f$ of the field applied below a reference frequency $fr$, whilst their dielectric anisotropy is negative for a frequency $f$ of the field applied above the reference frequency $fr$ at a given temperature T. For example, $fr$ may be equal to 10 kHz at $T = 25°$ C.

A liquid crystal lens of the type used in the device according to the invention is shown in section in FIG. 2.

A flat glass wall 1 and a spherical glass wall 2, separated by an annular liner 3, are covered internally with transparent electrodes 4 and 5, respectively. These electrodes may be obtained from a mixture of tin oxide and indium oxide applied to the transparent walls by cathode sputtering.

In addition, these electrodes are treated in such a way that the molecules of the liquid nematic crystal introduced through an opening 6 are aligned parallel to the walls in a given direction Δ. This treatment may be carried out by the vacuum deposition onto the electrodes of a surfactant, for example silicon monoxide, with a grazing incidence on the electrodes. The resulting deposits 7 and 8 will tend to align the molecules in the direction Δ imposed when the crystal 9 is introduced into the interior of the lens.

When an a.c. voltage is applied between the two electrodes, the molecules of the liquid crystal are rigidified parallel to the walls in the direction Δ or oscillate to become parallel to the optical axis of the beam, depending on the frequency of the a.c. voltage applied.

Since the polarization of the incident beam is parallel to the direction Δ, the index of the liquid crystal for the incident beam when $f$ is higher than $fr$ is equal to the principal extraordinary index of the crystal and when $f$ is lower than $fr$ this index decreases until it reaches the ordinary index $n_o$ when the major axis of all the molecules is perpendicular to the walls. Variations in index, $\Delta n$, of 0.2 may be obtained with substances of which the mean index is of the order of 1.6.

FIG. 3 shows an optical reader which uses a liquid crystal lens according to the invention. A laser source 30 emits a beam polarised rectilinearly onto a birefringent prism 31. The beam emerging from the prism is oriented by means of a reflecting mirror 32, the reflected beam being substantially parallel, towards a liquid crystal lens 33 of the type described with reference to FIG. 2. This lens causes the beam to converge onto a lens 34, which may be a microscope lens and which focusses the beam it receives at a point O of the reflecting surface 36, carrying the information, of a data carrier 37 after having passed through a quarter-wave thin plate 35.

This beam is thus reflected by the surface 36 and passes back through the quarter wave plate 35, the lens 34, the liquid crystal lens 33 and is reflected by the mirror 32. Since the beam has passed through the quarter wave plate 35 twice, its polarization has turned through 90°. The beam then passes through the birefringent prism and, since its polarization vector has changed, it emerges from the prism in a direction different from the direction of the incident beam emanating from the direction of the incident beam emanating from the laser source. The beam issuing from the prism passes through a cylindrical lens 38 and is detected by an assembly 39 of four photodetector or cells arranged as shown in the Figure in a plane perpendicular to the beam. Two adder amplifiers 40 and 41 are respectively connected to the outputs of two diagonally arranged cells. The outputs of the adders 40 and 41 are connected on the one hand to the inputs of an adder amplifier 42, which supplies the reading signal (V), and on the other hand to the inputs of a differential amplifier 43 which supplies a signal ε characteristic of the focussing deviation, i.e. the distance between the focussing point of the reading beam and the reflecting surface 36 of the carrier. The output of the differential amplifier 43 is connected to a voltage-frequency converter which supplies a constant amplitude signal ε(f) of frequency $f = fr$ when ε = 0 and of frequency $f$ above or below $fr$, depending on the sign of the focussing deviation. This variable frequency alternating signal is applied between the two electrodes of the liquid crystal lens 33. Thus, the index of the liquid crystal is capable of varying about a mean value equal for example to 1.6, the deviation $\Delta n$ being of the order of 0.2 for a frequency deviation $\Delta f$ of 2 kHz. The position adjustment range of the focussing point may thus reach 15 microns with a reading lens having a focal length of 6mm, the curved wall of the liquid crystal lens having a radius of curvature of 25 cm. The response time of a system of this kind is of the order of 5 ms.

The invention is not limited to the embodiments which have been described and illustrated. In particular, for the liquid crystal lens, the response times of the system, associated with the oscillation of the molecules of the liquid crystal, may be reduced by giving the lens the form of a Fresnel lens so that the thickness of the lens and hence the thickness of the liquid crystal are smaller.

It is also possible to use a liquid crystal with negative dielectric anisotropy. In this case, the molecules of the liquid crystal are oriented perpendicularly to the walls in the absence of an electrical field, for example by adding a suitable doping agent to the nematic mixture. When an alternating electrical field of variable amplitude is applied between the electrodes, the molecules oscillate so that their major axis becomes perpendicular to the field applied. The index of the crystal which, at rest, is substantially the ordinary index $n_o$, tends towards the value $n_E$ in the presence of an electrical field.

On the other hand, for the optical reader, if the liquid crystal used in the lens has an index variable in dependence upon the intensity of the field applied, the electrodes of the lens will receive a carrier wave amplitude-modulated by the error signal (ε) because in this case it is with the value of the amplitude of the alternating field created between the electrodes that the oscillation of the molecules and hence the variation in index are associated.

Finally, it is possible to combine in the optical reader, shown in FIG. 3 the effects of the variations in amplitude and variations in frequency by applying an amplitude- and frequency-modulated signal between the electrodes of the lens.

What we claim is:

1. An optical projection device for focussing an optical beam having an optical axis and polarized rectilinearly in a direction Δ perpendicular to said optical axis, comprising a hollow glass lens arranged on the path of said beam, said hollow glass lens having inner walls and comprising two transparent electrodes arranged on said inner walls, supply means for applying to said two electrodes a variable electrical field, said lens containing a liquid nematic crystal having molecules capable of oscillating under the action of said electric field, the index thus presented by said liquid crystal to said beam varying between the ordinary index $n_o$ and the extraordinary index $n_E$ of said liquid crystal.

2. An optical projection device as claimed in claim 1, wherein said lens comprises means for aligning the molecules of said liquid crystal in the absence of said electrical field in said direction Δ.

3. An optical projection device as claimed in claim 2, wherein when said liquid crystal has a positive dielectric anisotropy, said means for aligning the molecules of liquid crystal are a layer of surfactant applied to said electrodes which ensures alignment of the molecules parallel to said electrodes of the lens in the absence of an electrical field, the index of said crystal being controlled by an alternating electrical field of variable amplitude.

4. An optical projection device as claimed in claim 3, wherein said lens have a flat entry surface and a spherical exit surface, said electrodes being formed by a mixture of tin oxide and indium oxide and said surfactant being silicon monoxide applied to said electrodes.

5. An optical projection device as claimed in claim 1, wherein said liquid crystal has a dielectric anisotropy variable in dependence upon the frequency of said applied electrical field, the molecules of said crystals being aligned parallel to said electrodes in the absence of the electrical field, rigidified in this position for a field frequency below a limit frequency and tending to become aligned perpendicularly of said electrodes for a field frequency above said limit frequency.

6. An optical reader intended for reading a moving data carrier by a concentrated optical beam, comprising opto-electrical means which supply an error signal proportional to the deviation between said data carrier and the focussing point of said beam, comprising an optical device for projecting said beam as claimed in claim 1, said error signal being applied to a control device which supplies a control signal applied between the electrodes of said lens, said variation in index producing a displacement of said focussing point of the beam so that said deviation is substantially zero.

* * * * *